United States Patent
Aoshima

Patent Number: 5,732,393
Date of Patent: Mar. 24, 1998

[54] VOICE RECOGNITION DEVICE USING LINEAR PREDICTIVE CODING

[75] Inventor: Shigeki Aoshima, Susono, Japan

[73] Assignee: Toyota Jidosha Kabushiki Kaisha, Toyota, Japan

[21] Appl. No.: 573,084

[22] Filed: Dec. 15, 1995

[30]  Foreign Application Priority Data

Feb. 7, 1995 [JP] Japan ................................ 7-019490

[51] Int. Cl.$^6$ ....................................................... G01L 3/00
[52] U.S. Cl. ........................ 704/246; 704/255; 704/250; 704/236
[58] Field of Search .......................... 395/2.28, 2.29, 395/2.5, 2.6, 2.55

[56]  References Cited

U.S. PATENT DOCUMENTS 5,522,012  5/1996  Mammone et al. .................. 395/2.59

FOREIGN PATENT DOCUMENTS 5-197397  8/1993  Japan.
6-348291  12/1994  Japan.

Primary Examiner—Allen R. MacDonald
Assistant Examiner—David Sofocleous
Attorney, Agent, or Firm—Kenyon & Kenyon

[57]  ABSTRACT

A sound processor (12) calculates first through third parameters according to an LPC cepstrum, a primary delta cepstrum and a secondary delta cepstrum. The first parameter catches a static characteristic, the second parameter catches a dynamic characteristic with time, and the third parameter catches a locally dynamic characteristic with time. A word dictionary (14) stores first through third parameters for a standard pattern. Hence, a DP matching unit (16) recognizes a voice based on a distance between an input voice of the three parameters and the standard pattern.

7 Claims, 1 Drawing Sheet

STRUCTURE OF FIRST EMBODIMENT

STRUCTURE OF SECOND EMBODIMENT

VOICE RECOGNITION DEVICE USING LINEAR PREDICTIVE CODING

BACKGROUND OF THE INVENTION

1. Field of the Invention

The invention relates to a voice-recognition device which parameterizes an input voice and compares with a reference word dictionary to recognize the voice.

2. Description of the Related Art

Conventionally, various types of equipment have been proposed which use voice-recognition means which have an excellent man-machine interface (a burden on an operator is reduced to some extent). For instance, it is very convenient in view of operability if various types of operations can be carried out by the voice of an operator. Therefore, various kinds of studies have been made on voice recognition, and various types of voice-recognition device have been proposed.

A well-known parameter for recognizing a voice uses an LPC (linear predictive coding) cepstrum. This method uses a coefficient of LPC cepstrum of a spectral envelop obtained by the LPC analysis, and recognizes the voice based on a distance between a coefficient of cepstrum contained in a dictionary and a coefficient of cepstrum obtained from the entered voice (an LPC cepstrum distance).

The parameter based on this LPC cepstrum indicates some moment in time only, and therefore, is suitable for recognizing a vowel sound which repeats the same waveform to some extent, or a phoneme which has a static characteristic. However, it is difficult for this parameter to catch dynamic characteristics possessed by plosive and nasal sounds.

In view of the above, it is known to use a delta cepstrum as the parameter. The delta cepstrum is a primary regression coefficient of several frames of cepstrum (several cepstrum which are different with time) obtained by the LPC cepstrum method. Therefore, the delta cepstrum corresponds with the primary differential of a cepstrum and becomes a parameter showing the amount of change. With a distance of this delta cepstrum (delta cepstrum distance) as a parameter, the changes in cepstrum can be judged (DP (dynamic programming) matching processing) as the parameter to effectively recognize plosive and nasal sounds.

In practical recognition, both the LPC cepstrum distance and the delta cepstrum distance are required to be taken into account, so that the recognition is performed on the basis of these distances added with weights assigned to them.

The LPC cepstrum distance and the delta cepstrum distance are different depending on a voice to be recognized. Therefore, the weights to these distances are preferably changed according to the conditions of the input voice. Japanese Patent Laid-Open Publication No. Hei 5-197397 (JP-A-05-197397) changes the weights based on the spectral changes in voice with time. Thus, the voice can be recognized more accurately.

Since the above prior art uses the delta cepstrum, the voice recognition can be made taking the dynamic characteristic with respect to time into account. However, the delta cepstrum relates to the change in cepstrum with time and is good at indicating a characteristic in a transient period when a consonant sound changes to a vowel sound, but cannot catch the characteristic of a plosive when it is sounded. In other words, since the plosive point of a plosive sound is included in a single frame among several frames for determining a primary regression coefficient, the delta cepstrum for the plosive point is almost zero.

Thus, the delta cepstrum takes an average of several frames, having a disadvantage that a dynamic change in spectrum cannot be caught locally.

SUMMARY OF THE INVENTION

The invention has been completed to remedy the above disadvantage, and aims to provide a voice-recognition device which catches locally dynamic changes with respect to time, thereby making it possible to improve discrimination of consonants and discriminating precision at a transient portion.

The invention relates to a voice-recognition device for recognizing a voice by parameterizing an input voice and comparing with a reference word dictionary, which comprises input voice parameterizing means for producing a first parameter catching a static characteristic of the input voice with respect to time, a second parameter catching a dynamic characteristic of the input voice with respect to time, and a third parameter catching as a characteristic a change in movement of the input voice with time; weight coefficient calculating means for calculating a weight coefficient for each parameter produced by the parameterizing means; and word-recognition means for selecting an optimum word according to the first to third parameters and the weight coefficient of each parameter with reference to the word dictionary.

The word-recognition means uses the first and second parameters and also the third parameter caught as a dynamic characteristic with respect to time, thereby making it possible to improve the discrimination of consonants and the discriminating precision at a transient portion.

It is characteristic that the first parameter is determined from an LPC cepstrum, the second parameter is determined from a delta cepstrum, and the third parameter is a secondary delta cepstrum.

The LPC cepstrum catches a static characteristic, the delta cepstrum catches a dynamic characteristic with time, and the secondary delta cepstrum catches a locally dynamic characteristic with time. They are adopted for the first to third parameters to provide desirable voice recognition.

It is also characteristic that the weight coefficient is determined according to the magnitudes of the delta cepstrum and the secondary delta cepstrum on word information to be referred to in the word dictionary.

The weight coefficient of each parameter is determined according to the magnitudes of the first and second delta cepstrum, and a large weight can be given to the first and second delta cepstrum when they are large and significant. Thus, every part of the input voice can be suitably recognized at all times.

Further, it is characteristic that the weight coefficient can be varied according to a ratio of the input voice to a noise.

Steady noises have a profound effect on the first parameter. Therefore, when the input voice has a low S/N (signal-to-noise) ratio and a large noise, the weights of the second and third parameters based on the first and second delta cepstrum which are not largely affected by the noise can be increased. Thus, the influence of noise can be taken into account to perform preferable voice recognition.

DESCRIPTION OF PREFERRED EMBODIMENTS

Embodiments of the invention will be described with reference to the accompanying drawings.

Figure 1:
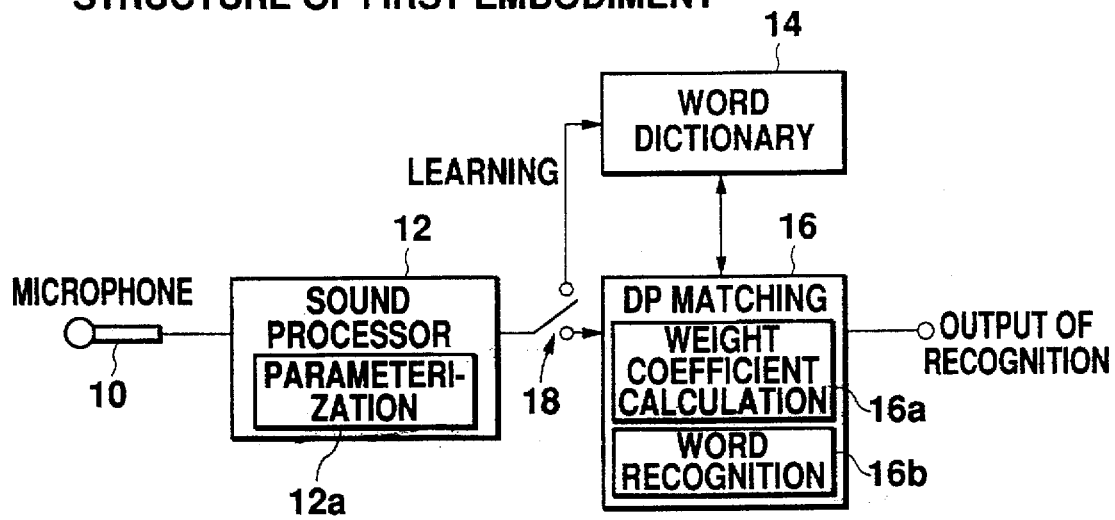
FIG. 1 is a block diagram of the structure of the first embodiment.
Figure 2:
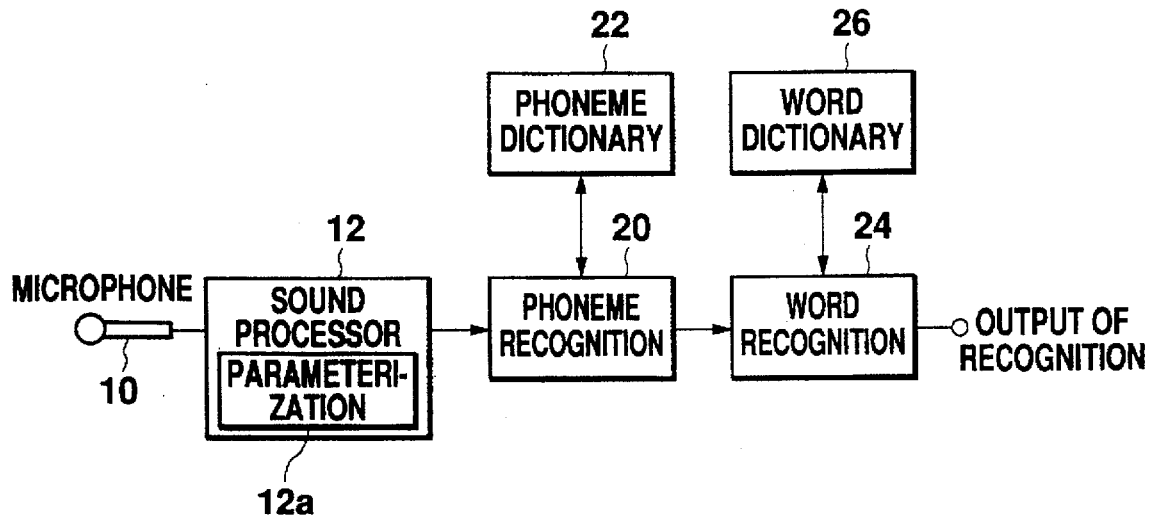
FIG. 2 is a block diagram of the structure of the second embodiment.

FIG. 1 is a block diagram of the overall structure of this embodiment, which comprises a microphone 10 for converting a voice into electrical voice signals, a sound processor 12 for processing the voice signals from the microphone 10 to calculate an LPC cepstrum, a word dictionary 14 for storing the LPC cepstrum for various words, and a DP matching 16 for recognizing the voice by calculating a distance between data provided by the sound processor 12 and data provided by the word dictionary 14. A switch 18 is disposed between the sound processor 12 and the DP matching 16 to also supply the word dictionary 14 with the output from the sound processor 12.

The sound processor 12 has a parameterizing part 12a in it to calculate a first parameter catching a static characteristic with respect to time, a second parameter catching a dynamic characteristic with respect to time, and a third parameter catching a locally dynamic characteristic with respect to time.

The word dictionary 14 stores the above three parameters for respective words. The DP matching 16 also has a weight coefficient calculating unit 16a and a word-recognition unit 16b in it. The weight coefficient calculating unit 16a calculates a weight coefficient according to the second and third parameters and/or an S/N ratio, as described later. The word-recognition unit 16b determines a distance between the input signal and the words stored in the dictionary with reference to the three parameters, performs a prescribed weighting computation on the obtained three distances, and selects a word having a minimum distance as the appropriate word.

The word dictionary 14 may previously store data with standard pronunciation on each word, but when a person who vocalizes is specified for the voice-recognition device which is mounted on a vehicle, the switch 18 can be operated to supply the word dictionary 14 with data from the sound processor 12, so that the word dictionary learns and stores data of each word.

Description of the Three Parameters

Description will be made of the three parameters (the first through third parameters) used in this embodiment. The first parameter is a parameter obtained from the LPC cepstrum. Generally, the LPC cepstrum coefficient is limited to a prescribed number (e.g., up to the eighth coefficient). The second parameter is a parameter obtained from a delta cepstrum which is a primary regression coefficient of each LPC cepstrum with approximately two to four frames. Further, the third parameter is a parameter which is obtained from a secondary delta cepstrum and calculated as a difference between two neighboring delta cepstrum.

Thus, this embodiment uses the secondary delta cepstrum as the third parameter. Accordingly, a locally dynamic change in spectrum on a plosive can be caught, thereby making it possible to provide voice recognition with high precision.

Description of Weighting

To assign a weight to each parameter, it is preferable that the first parameter is weighted for steady portions such as a vowel sound having a static characteristic with respect to time, the second parameter is weighted for transient portions from a consonant having a dynamic characteristic to a vowel sound with respect to time, and the third parameter is weighted for plosive points with a locally dynamic characteristic with respect to time.

(i) In the first method, a weight coefficient of each parameter is determined according to the magnitudes of the delta cepstrum and the secondary delta cepstrum on word information.

A distance Dsum which is determined by weighting calculation of the three parameters is expressed as follows:

$$Dsum = \alpha(t)D(c) + \beta(t)D(dc) + \gamma(t)D(d^2c)$$

where, $D(c)$, $D(dc)$ and $D(d^2c)$ designate distances determined from the first through third parameters, $\alpha(t)$, $\beta(t)$ and $\gamma(t)$ designate weight coefficients at time t, and $\alpha(t) + \beta(t) + \gamma(t)$ is equal to 1.

It is assumed that in the word dictionary 14 at the time t, the n-th term in the secondary delta cepstrum (the third parameter) in the standard pattern is $d^2c_n(t)$, the n-th term in the delta cepstrum (the second parameter) is $dc_n(t)$, a transform function of a square sum of the secondary delta cepstrum and $\gamma(t)$ is $f(x)$, and a transform function of a square sum of the delta cepstrum and $\beta(t)$ is $g(x)$. Also, the weight coefficients $\gamma(t)$ and $\beta(t)$ are determined by the following equations:

$$\gamma(t) = f\{\sqrt{(\Sigma d^2 c_k(t)^2)}\}$$

$$f(x) = (1/a)X \quad (X < a)$$

$$f(x) = 1 \quad (X \geq a)$$

$$\beta(t) = g\{\sqrt{(\Sigma dc_k(t)^2)}\}$$

$$g(x) = (1 - f(x)/b)X \quad (X < b)$$

$$g(g) = 1 - f(x) \quad (X \geq b)$$

where, k is equal to 1~n+1 when the zeroth to n-th items are used in the primary delta cepstrum and the secondary delta cepstrum, and a, b are given a constant which is determined according to the conditions.

When the two weight coefficients $\gamma(t)$, $\beta(t)$ are thus determined, $\alpha(t)$ is also determined by them, and the distance Dsum is expressed as follows.

$$Dsum = [1 - f\{\sqrt{(\Sigma d^2 c_k(t)^2)}\} - g\{\sqrt{(\Sigma dc_k(t)^2)}\}]D(c) + g\{\sqrt{(\Sigma dc_k(t)^2)}\}D(dc) + f\{\sqrt{(\Sigma d^2 c_k(t)^2)}\}D(d^2c)$$

Since the weight coefficients are determined as described above, when the secondary delta cepstrum is large, $\gamma(t)$ is increased and $\beta(t)$ is decreased accordingly; and when both the first and second delta cepstrum have a large value, the weights are also increased. Therefore, when the first and second delta cepstrum have a large value, namely these values are significant, the weight coefficients are increased to enable the comparison with the standard pattern of the word dictionary, making it possible to perform word recognition more accurately.

(ii) In the second method, the weight coefficient to each parameter is determined according to the S/N ratio of an input voice signal.

Noises such as the sounds of air conditioner fans and automobile engines are considered to be static with respect to time. In this case, the first parameter is largely affected by the noises, but the second and third parameters are hardly affected because they are parameters based on a variation with time.

Hence, to recognize the voice one time, a given weight coefficient δ with respect to time is used to determine a distance Dsum as follows.

$$Dsum = (1-2\delta)D(c) + \delta D(dc) + \delta D(d^2c)$$

For instance, the S/N ratio may be determined by calculating the average of an average signal level of input voice signals over several hundred milliseconds immediately before vocalization and an average signal level over several hundred milliseconds after vocalization, or may be determined from a ratio of the zeroth coefficients of the LPC cepstrum during the above periods. Furthermore, the S/N ratio may be determined by the level of noise immediately before vocalization only.

Further, δ is determined as follows with the obtained S/N ratio as y.

$$\delta = (1/2b)y \quad (y<b)$$

$$\delta = 1/2 \quad (y \geq b)$$

Accordingly, the distances Dsum are expressed as follows.

$$Dsum = (1-y/b)D(c) + (y/2b)D(dc) + (y/2b)D(d^2c) \quad (y<b)$$

$$Dsum = (1/2)D(dc) + (1/2)D(d^2c) \quad (y \geq b)$$

Thus, when the noise is high, the weights on the second and third parameters which are less affected by the noise are increased to perform effective voice recognition. It is also preferable to combine the first and second methods. Specifically, as to the terms D(c), D(dc) and D(d²c) to obtain Dsum by the first method, (1−y/b), (y/2b) and (y/2b) are multiplied respectively when y is smaller than b, and 0, (½) and (½) are multiplied respectively when y is larger than or equal to b.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A voice-recognition device for recognizing a voice by parameterizing an input voice and comparing the parameterized voice with a plurality of word parameters to be referred to, characterized by:

an input voice parameterizing unit for producing a first parameter catching a static characteristic of the input voice with respect to time, a second parameter catching a dynamic characteristic of the input voice with respect to time, and a third parameter catching as a characteristic a change in movement of the input voice with time;

a weight coefficient calculating unit for calculating a weight coefficient for each parameter produced by the parameterizing unit;

a word dictionary for storing the first, second and third parameters which are standards for the plurality of words to be referred to; and a word-recognition unit for selecting an optimum word by comparing the respective parameters of the respective words in the word dictionary according to the first, second and third parameters and the weight coefficient of the each parameter.

2. The voice-recognition device according to claim 1, wherein said first parameter is a parameter obtained from an LPC cepstrum, said second parameter is a parameter obtained from a delta cepstrum, and said third parameter is a secondary delta spectrum.

3. The voice-recognition device according to claim 2, wherein said word-recognition unit calculates distances between the respective parameters of the respective words stored in the word dictionary and the first, second and third parameters on the input voice, and selects an optimum word based on a result obtained by adding weights to the calculated distances.

4. The voice-recognition device according to claim 3, wherein said weight coefficient calculating unit determines said weight coefficient based on the magnitudes of the delta cepstrum and the secondary delta cepstrum of the words to be referred to which are obtained from said word dictionary.

5. The voice-recognition device according to claim 4, wherein the weight on the distance between said third parameters is determined to be larger as the secondary delta cepstrum is larger, the weight on the distance between said second parameters is determined to be larger as the delta cepstrum is larger, and the weights on the distance between said first parameters are determined by subtracting said two weights from a prescribed value.

6. The voice-recognition device according to claim 1, wherein said weight coefficient calculating unit varies said weight coefficient according to a ratio of said input voice and noise.

7. The voice-recognition device according to claim 6, wherein the weight of the distance of the second and third parameters is relatively increased with respect to the weight of the distance of the first parameter when the voice-to-noise ratio is large.

* * * * *